US006570597B1

(12) United States Patent
Seki et al.

(10) Patent No.: US 6,570,597 B1
(45) Date of Patent: May 27, 2003

(54) ICON DISPLAY PROCESSOR FOR DISPLAYING ICONS REPRESENTING SUB-DATA EMBEDDED IN OR LINKED TO MAIN ICON DATA

(75) Inventors: Hiroo Seki, Yokohama (JP); Hajime Somura, Yokohama (JP); Kanji Itaki, Yokohama (JP); Kenji Kawasugi, Yokohama (JP); Rui Yamagami, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/431,156

(22) Filed: Nov. 1, 1999

(30) Foreign Application Priority Data

Nov. 4, 1998 (JP) .......................... 10-313092
Oct. 27, 1999 (JP) .......................... 11-305977

(51) Int. Cl.⁷ .................................. G06F 3/14
(52) U.S. Cl. ................. 345/835; 345/837; 345/839; 345/841; 345/853
(58) Field of Search .................. 345/837, 835, 345/841, 852, 853, 839

(56) References Cited

U.S. PATENT DOCUMENTS

| 5,317,687 | A | * | 5/1994 | Torres | 345/835 |
| 5,572,641 | A | * | 11/1996 | Kuo | 345/835 |
| 6,100,888 | A | * | 8/2000 | Gourdol et al. | 345/835 |

FOREIGN PATENT DOCUMENTS

| JP | A-6-28145 | 2/1994 |
| JP | A-7-210360 | 8/1995 |

* cited by examiner

*Primary Examiner*—Kristine Kincaid
*Assistant Examiner*—Thomas T. Nguyen
(74) *Attorney, Agent, or Firm*—Oliff & Berridge, PLC (57) ABSTRACT

An icon display processor for use in a computer permits a user to intuitively recognize sub-data embedded in, or linked to, main data while a main icon symbolizing the main data is being displayed. When data B and C are embedded in document A, if a main icon is displayed, sub-icons corresponding to the embedded data are displayed behind the main icon. Thus, the user can intuitively recognize the sub-data contained in the document A. A sub-icon is displayed for each item or kind of sub-data. The user can directly process the sub-icons.

9 Claims, 11 Drawing Sheets

FIG.2

COMPOSITIONAL DISPLAY

FIG.3

PARALLEL DISPLAY

FIG.4

OVERLAP DISPLAY OF SMALL SUB-ICONS

FIG.5

PARALLEL DISPLAY OF SMALL SUB-ICONS

FIG.6

COMBINATION DISPLAY

FIG.7

PAGE-BASIS DISPLAY

FIG.8

(A) INDIVIDUAL DISPLAY
(B) CATEGORY-BASED DISPLAY

FIG.9

(A) NORMAL DISPLAY (REDUCTION DISPLAY)

(B) EXPANSION DISPLAY

FIG.10

TEXT   GRAPHICS   TABLE   MOVIE   PHOTO   SOUND

FIG.13 DRAGG AND DROP B

FIG.14 RIGHT-CLICK B (DISPLAY EDITING MENU)

FIG.15 DRAGG AND DROP B

| FILE NAME | FILE TYPE | DISPLAY | ORDER | CAPACITY | THUMBNAIL |
|---|---|---|---|---|---|
| DOCUMENT A | Doc | YES | 0 | 962KB | XXXXXXXX |
| TABLE B | Xls | YES | 1 | 15KB | |
| IMAGE C | Bmp | YES | 3 | 24KB | |
| DOCUMENT D | Doc | NO | 2 | 11KB | XXXXXXXX |

$\overbrace{\phantom{DOCUMENT FILE FOR MAIN DATA}}$

DOCUMENT FILE FOR MAIN DATA

< DOCUMENT >

< File Name > "Document A" < /File Name >

< BODY OF TEXT >

< CHAPTER >

Report results of statistical processing.

< Table > "Table B.Xls" < /Table >

The results are the same as shown in the table above.

. . .

< /CHAPTER >

< CHAPTER >

It can be seen from the foregoing that this is excellent.

< /CHAPTER >

< /BODY OF TEXT >

< /DOCUMENT >

ICON DISPLAY PROCESSOR FOR DISPLAYING ICONS REPRESENTING SUB-DATA EMBEDDED IN OR LINKED TO MAIN ICON DATA

BACKGROUND OF THE INVENTION

1. Field of the Invention

The present invention relates to an icon display processor for displaying and processing icons used on computer displays and, more particularly, to a method of displaying icons representing sub-data (i.e., objects or contents) embedded in, or linked to, main data (e.g., a document).

2. Description of the Related Art

When a list of documents is displayed with the conventional icon display processor, an icon is displayed for each document. The icon symbolizes the document. Using such icons, the user can select documents and perform operations (e.g., copying) on the documents.

In recent years, it has become possible to embed various kinds of data as document parts in this document or to link various kinds of data. For instance, image data and graphical data can be inserted in text data. Furthermore, voice and motion pictures can be inserted. These kinds of data will herein be referred to as sub-data and are generally managed as files separate from the main data. Techniques regarding icons are disclosed in Japanese Unexamined Patent Publication Nos. 7-210360 (1995) and 6-28145 (1994).

With the prior art processor, icons representative of documents are simply displayed. Presence or absence of data (objects or contents) contained in a document or their kinds cannot be confirmed unless the document is once opened. For the same reason, it is impossible to gain direct access to independent data items within a document while an icon for the document is being displayed.

SUMMARY OF THE INVENTION

In view of the foregoing problems with the prior art technique, the present invention has been made to provide an icon display processor permitting a user to intuitively recognize sub-data embedded in, or linked to, main data while an icon for the main icon is being displayed.

The present invention also provides an icon display process or permitting a user to directly handle sub-data embedded in, or linked to, the main data while an icon for the main data is being displayed.

The icon display processor according to the present invention has a main icon display unit that displays a main icon representative of main data, and a sub-icon display unit that displays a sub-icon representative of sub-data together with the main icon if the sub-data form a part of the main data and are embedded in, or linked to, the main data.

In this configuration, the sub-icon representative of the sub-data and forming a part of the main data is displayed while the main icon is being displayed. This permits the user to recognize the presence of the sub-data. That is, since the sub-icon is displayed, the user can intuitively recognize the structure of the main data. The sub-icon may be identical in size to or smaller than the main icon.

The sub-icon described above may be displayed close to the main icon, or the sub-icon is displayed such that it appears partially from behind the main icon.

The aforementioned sub-icon may be displayed for each sub-data item. Alternatively, the sub-icon may be displayed for each kind of sub-data. Where a sub-icon is displayed for each item of sub-data, the user can easily recognize the number of sub-data items or their order. Where a sub-icon is displayed for each kind of sub-data, the user can readily recognize the kinds of sub-data contained.

Preferably, a mode selector unit is provided for permitting the user to choose between a close display mode in which plural sub-icons are displayed so as to overlap with each other in a congested manner and an expansion display mode in which plural sub-icons are displayed so as to overlap with each other but in a less congested manner. In the close display mode, the area of display is reduced and thus the display area can be utilized efficiently. In the expansion display mode, the presence of each sub-data item can be represented more clearly.

The sub-data described above may take a form corresponding to the kind of the sub-icon. This configuration permits the user to grasp the kind of the sub-data simply by viewing the sub-icon.

The icon display processor may have a program-activating unit that activates an application program corresponding to the sub-icon by performing given processing on the sub-icon. This application program processes the sub-data represented by the sub-icon.

This structure has the advantage that the application program associated with the sub-data can be directly activated without once activating the application program associated with the main data. Consequently, the cumbersomeness of the operations can be alleviated. Furthermore, the time taken to open the sub-data can be reduced. In addition, even if any application program for processing the main data is not present, the sub-data can be directly operated.

The icon display processor may have a copy unit that copies sub-data represented by the sub-icon when given processing is performed on the sub-icon. When the main icon moves, the sub-icon follows it. However, the sub-icon can be operated independent of the main icon.

An object managing table may be formed for each main data item to manage the kinds and the sequence of the sub-data items.

Multimedia data contains various kinds of data such as texts, graphics, images, motion pictures, and voices. Where the sub-icons as described above are displayed, if multimedia data are represented by icons, the data structure can be visualized. Therefore, the user can intuitively recognize the kinds and proportions of data contained. Before the data are opened, the sound volume and the resolution can be adjusted.

Other objects and features of the invention will appear in the course of the description thereof, which follows.

BRIEF DESCRIPTION OF THE DRAWINGS

The invention will be described with reference to the following drawings, wherein like numerals designate like elements, and wherein.

DESCRIPTION OF THE PREFERRED EMBODIMENTS

Figure 1:
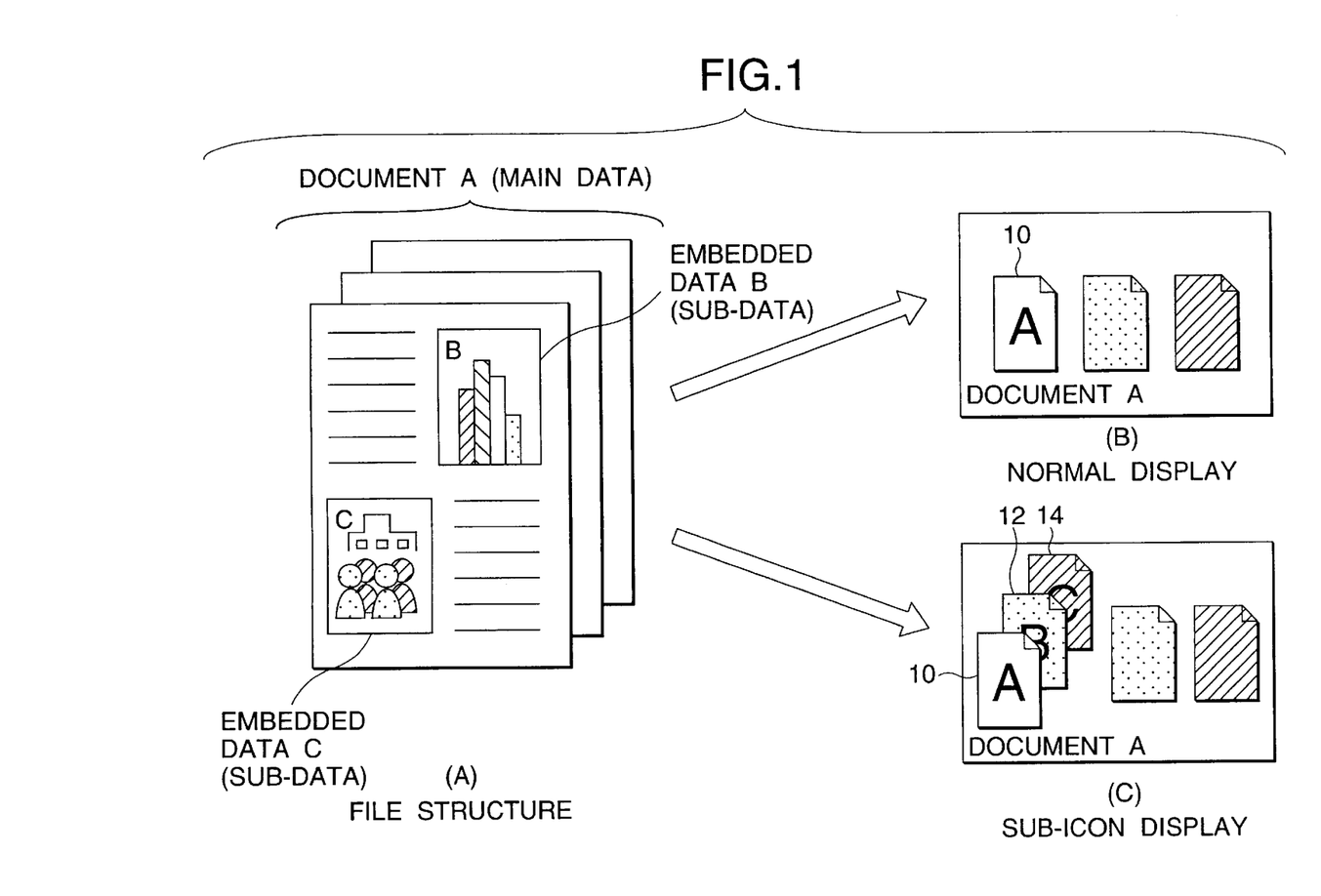
FIGS. 1(A)–1(C) show an example of file structure and examples of display of sub-icons.

Referring to FIG. 1, an example of display of icons provided by an icon display processor in accordance with the present invention is shown. A document structure regarding a document A that is main data is shown in FIG. 1(A). FIG. 1(B) indicates an example of display of icons in a normal display mode. FIG. 1(C) indicates an example of display of sub-icons in accordance with the invention.

As shown in FIG. 1(A), the document A is composed of data across plural pages (text data). For example, in the first page, data B and C are embedded as sub-data. For instance, the embedded data B is graphical data, and embedded data C is image data. Generally, these embedded data B and C are managed by a file different from the document A. However, if the document A is opened on an application software, these embedded data B and C are displayed as parts of the document A. In some cases, data may not be embedded in a document but rather other data forming parts of the document data is linked to that document. The invention can also be applied to such linked data.

In the conventional normal display mode in FIG. 1(B), a document icon 10 is displayed for each document. This does not permit the user to recognize the sub-data contained in the document A. On the other hand, in a display of sub-icons shown in (C), the document icon 10 is accompanied by sub-icons 12 and 14, which symbolize the embedded data B and C, respectively.

The display of sub-icons shown in FIG. 1(C) has the advantage that the user can immediately know what sub-data are contained in the main data because the main icon and one or more sub-icons are displayed as a group. Furthermore, the sub-icons 12 and 14 can be handled independently as described later. Various examples of display of sub-icons are shown in FIGS. 2–7, FIGS. 8(A) and 8(B), and FIGS.9(A) and 9(B).

Figure 2:
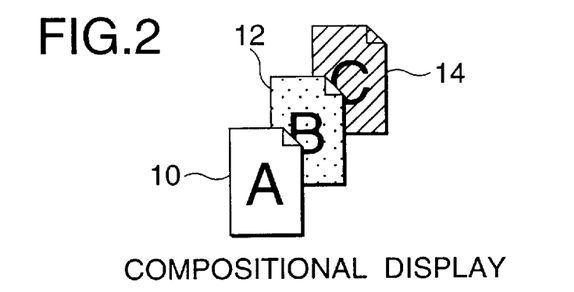
FIG. 2 is a view showing an example of compositional display of sub-icons.
Figure 3:
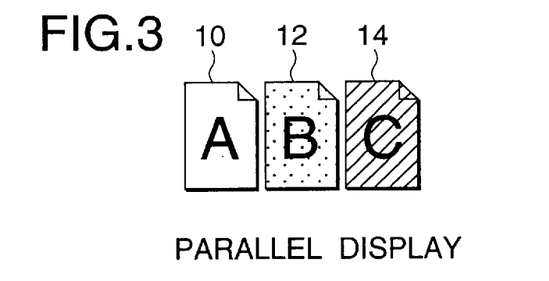
FIG. 3 is a view showing an example of parallel display of sub-icons.

FIG. 2 shows an example of display of sub-icons similar to the example of display of sub-icons shown in FIG. 1. In this example of display, the sub-icons 12 and 14 are displayed in the same size as the main icon 10. FIG. 3 shows an example of parallel display of sub-icons. The main icon 10 is at the left end. To the right, one or more sub-icons 12, 14 are displayed. In this way, sub-icons are displayed in an overlapping or close relation to the main icon. The close positional relations between the icons enables the user to intuitively recognize the dependent relation of the sub-icons to the main icon.

Figure 4:
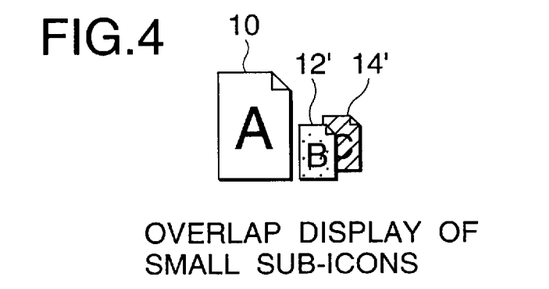
FIG. 4 is a view showing an example of overlap display of small sub-icons.
Figure 5:
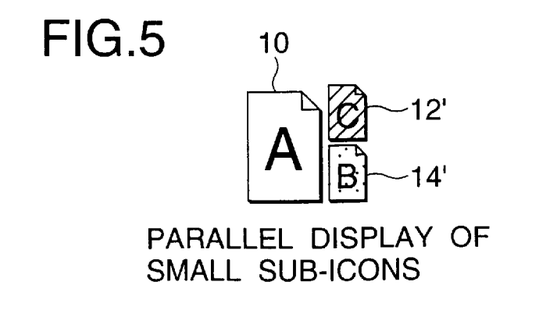
FIG. 5 is a view showing a parallel display of small sub-icons.

In FIG. 4, small sub-icons are displayed so as to overlap with each other. That is, sub-icons 12' and 14' smaller than a main icon 10 are displayed. This accentuates the relation between the main icon and the sub-icons. In FIG. 5, small sub-icons are displayed in a parallel relation. This clearly represents the relation between the main icon and the sub-icons in the same way as in the example of display shown in FIG. 4.

Figure 6:
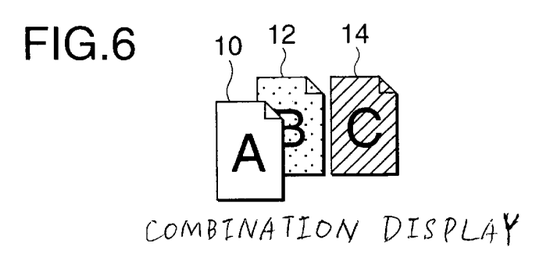
FIG. 6 is a view showing an example of combination display of sub-icons.

In the example of combination display shown in FIG. 6, plural sub-icons 12, 14 are displayed parallel behind the main icon 10. This example of display also represents the relation between the main icon and the sub-icons more clearly.

Figure 7:
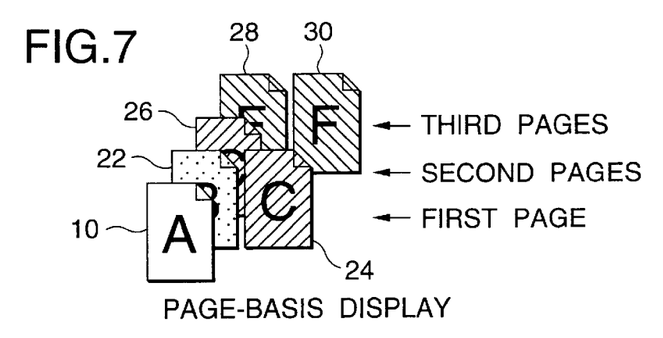
FIG. 7 is a view showing an example of page-based display of sub-icons.
Figure 8:
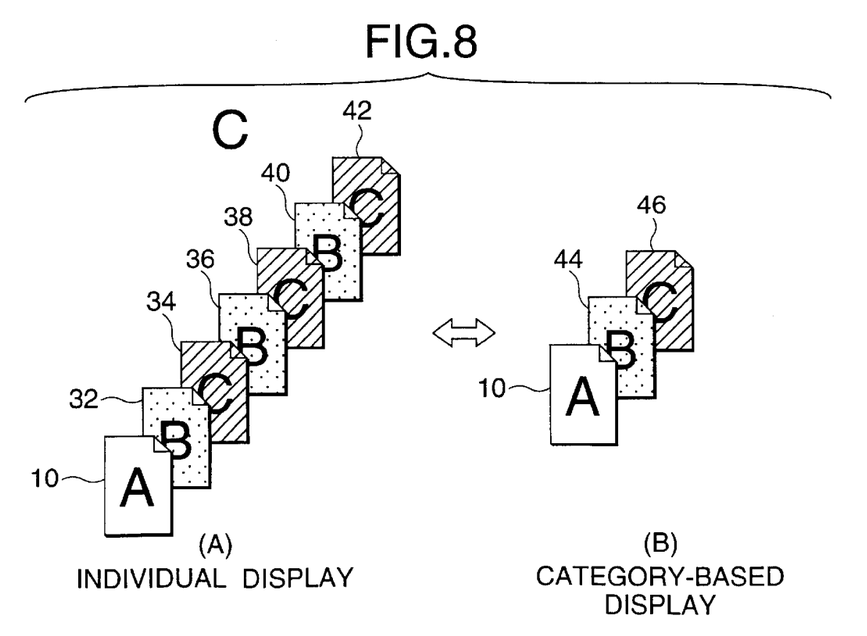
FIGS. 8(A) and 8(B) show an example of individual display mode and an example of category-based display.
Figure 9:
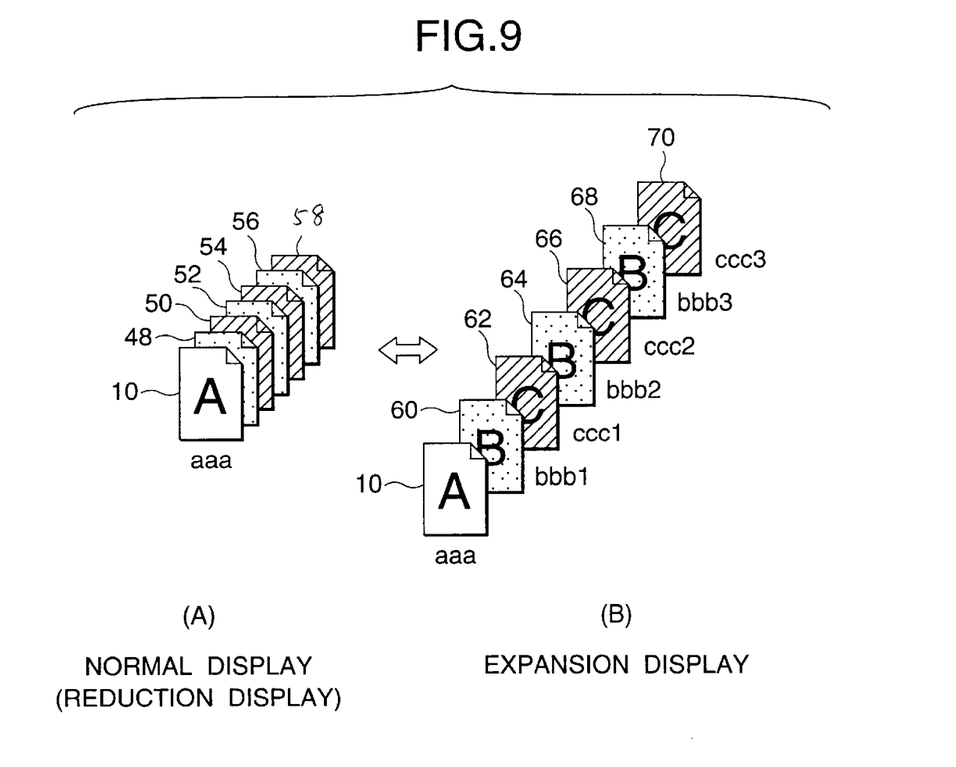
FIGS. 9(A) and 9(B) show a normal display mode and an expansion display mode.

FIG. 7 shows an example of display in which different sub-icons are displayed for different pages. In particular, sub-icons 22–30 are displayed for different pages behind the main icon 10. The two sub-icons 22, 24 corresponding to two sub-data items are displayed in the first page. Similarly, other sub-icons are displayed in the following pages. Thus, this example of display permits the user to grasp the number of sub-data items contained in each page and their kinds.

FIGS. 8(A) and 8(B) show two display modes. Shown in FIG. 8(A) is an individual display mode in which sub-icons 32–42 are displayed for each sub-data item. Shown in FIG. 8(B) is a category-based display mode in which sub-icons 44 and 46 are displayed for each category of sub-data contained in a document. The individual display mode allows the user to grasp the sequence and number of sub-data items contained in the document. The category-based display mode permits the user to grasp every category of sub-data contained in the document.

A reduction display mode that is a normal display mode is shown in FIG. 9(A). An expansion display mode is shown in FIG. 9(B). In the reduction display mode, plural sub-icons 48–58 are displayed closely and obliquely from the left bottom end to the right top end behind the main icon 10 such that they overlap with each other. In the expansion display mode shown in FIG. 9(B), the icons are displayed essentially in the same format but with an increased spacing. That is, the array of the icons are elongated obliquely. The reduction display mode makes it possible to utilize the finite display area efficiently. The expansion display mode permits the user to recognize individual icons clearly. In the normal reduction display mode, only the file name of the main data is displayed together with the main icon 10. On the other hand, in the expansion display mode, the file names of individual sub-data items are displayed close to the sub-icons along with the file name of the main data. Of course, the processor may be designed in such a way that the user can choose whether these file names are displayed or not.

Figure 10:
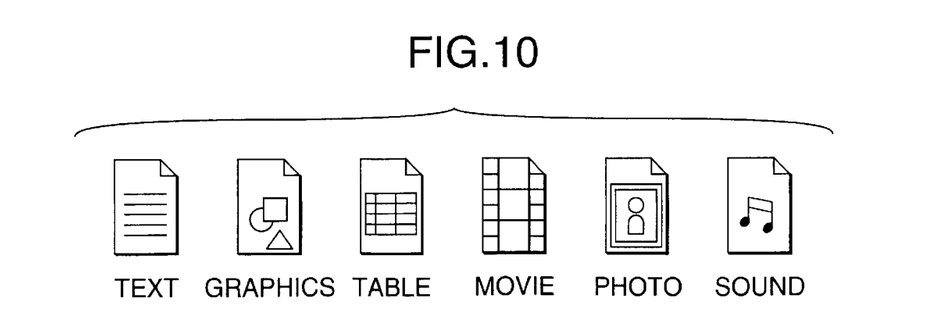
FIG. 10 is a view showing forms of icons according to kinds of data.

FIG. 10 shows an example of display in which a different icon is displayed for each different kind or category of data.

This permits the user to intuitively recognize the kinds of data when he or she views the main icon and the sub-icons. Of course, each icon may symbolize an application program linked to data.

Figure 11:
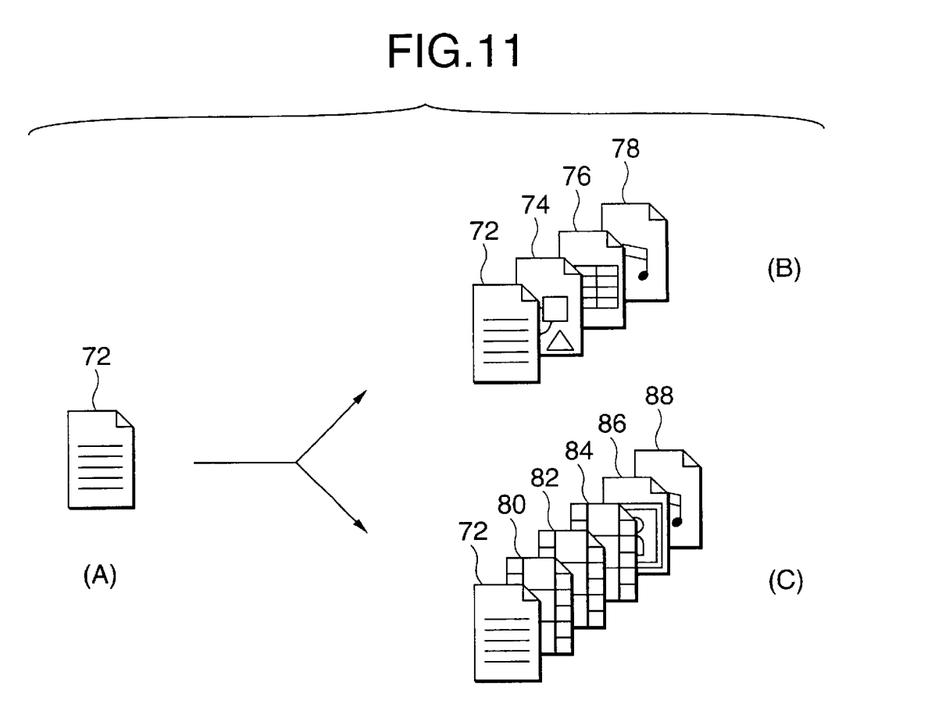
FIGS. 11(A)–11(C) show examples of display of sub-icons.

In FIG. 11(A), only a main icon 72 is shown. Under this condition, it is impossible to recognize the kind of data contained in multimedia data symbolized by the main icon. With the sub-icon display method described above, a display as shown in FIG. 11(B) can be provided, and the user can recognize the kinds of data contained in the main data symbolized by the main icon 72 because sub-icons 74–78 symbolize the contained data. Specifically, the user can intuitively recognize that tables and graphics are contained in text data and that sound is added. Therefore, where a display is provided as shown in FIG. 11(B), if the user clicks on the sub-icon 78, sub-data can be played back as voice data without opening the main icon 72. Where a display is provided as shown in FIG. 11(C), plural sub-icons 80–88 permit the user to recognize that numerous movies are contained in the text. Then, the user can make preparations for the next action, e.g., the display is switched to a higher resolution mode.

Figure 12:
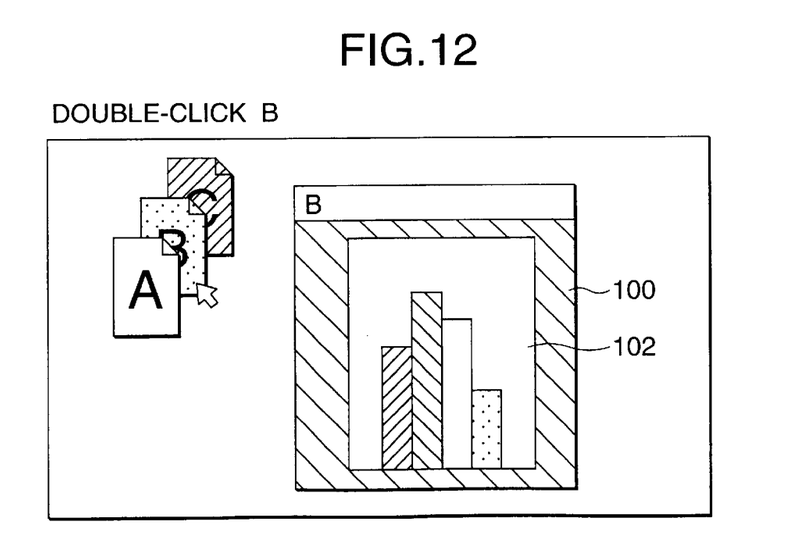
FIG. 12 is a view illustrating an opening operation on a sub-icon.

Examples of handling of icons in an icon display processor in accordance with the present invention are shown in FIGS. 12–15. Referring to FIG. 12, if the user double-clicks a certain sub-icon, an application program associated with sub-data symbolized by the sub-icon is activated. That is, a window 100 is opened. Graphics data 102 corresponding to the sub-data is represented within the window 100.

Figure 13:
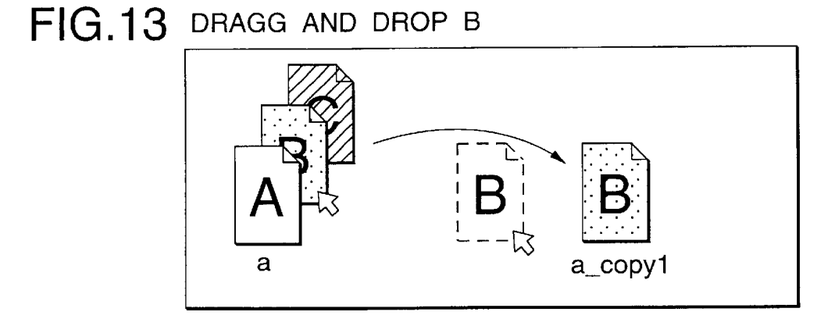
FIG. 13 is a view illustrating an operation on a subicon when a copy is made.

Referring next to FIG. 13, if one drags and drops a certain sub-icon, the sub-icon itself can be copied. The sub-data symbolized by the sub-icon can be copied.

Figure 14:
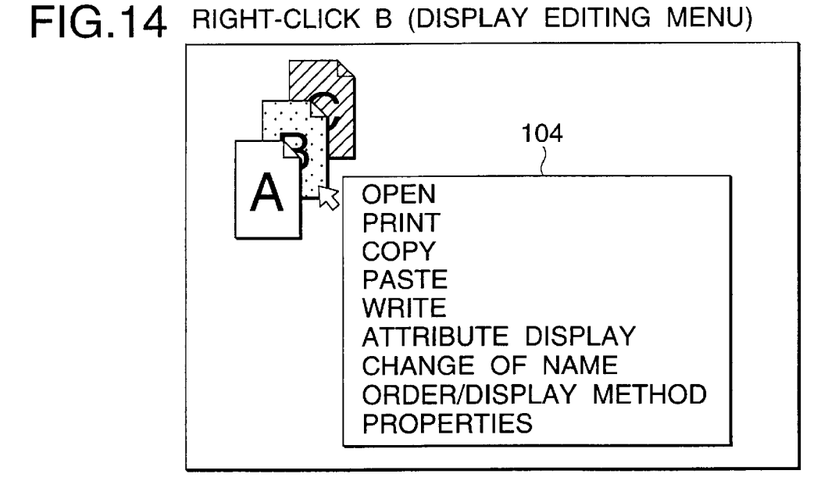
FIG. 14 is a view showing a display of an editing menu corresponding to a sub-icon.

Referring next to FIG. 14, if a certain operation (e.g., right-clicking) is performed on a certain sub-icon, an editing menu 104 is displayed. If a desired option item is selected from the menu, a desired operation can be performed.

Figure 15:
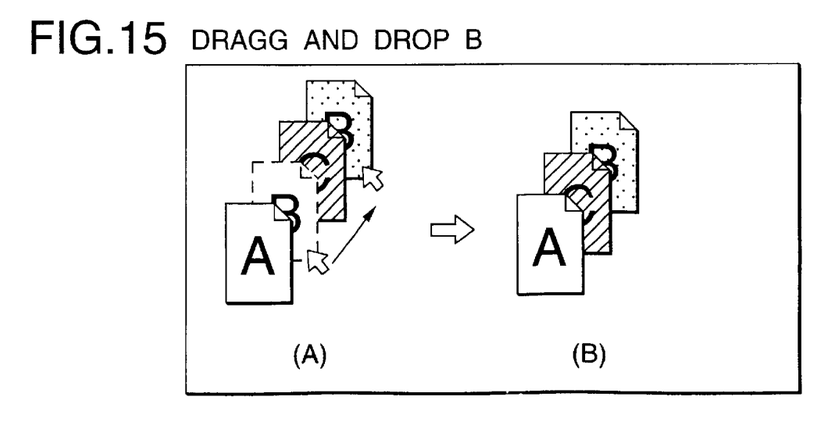
FIG. 15 is a view illustrating an operation for changing the order of sub-icons.

Referring next to FIG. 15, it is assumed that a user wants to change the turn of display of a certain sub-icon. The user inserts the sub-icon into a desired location as shown to the left of the figure. Then, the user can change the turn of the sub-icon as shown to the right of the figure. The processor may be so designed that the user can choose whether the turn of insertion of the sub-data symbolized by the sub-icon is changed.

Figure 16:
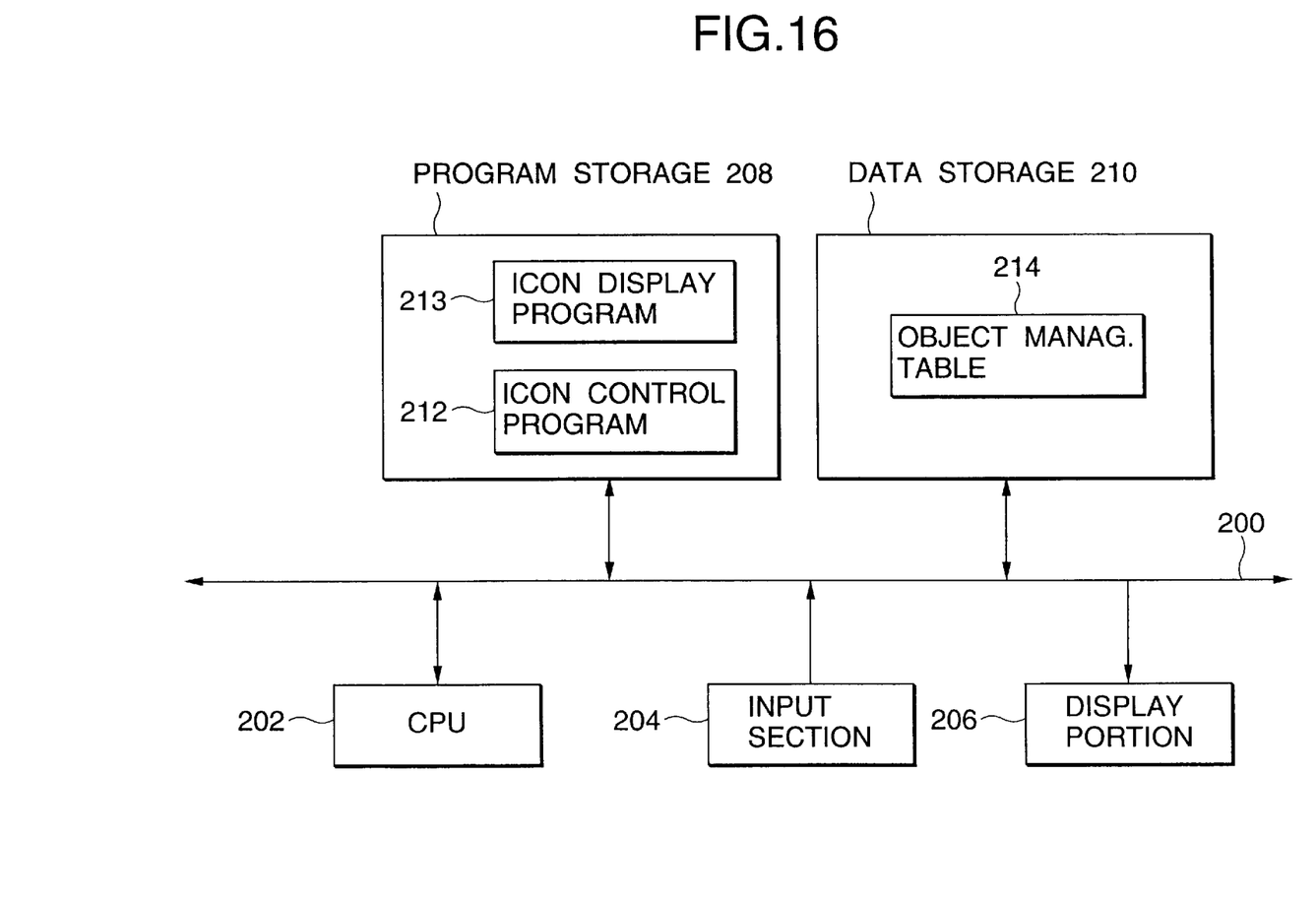
FIG. 16 is a block diagram of an icon display processor in accordance with the present invention.

An icon display processor in accordance with the present embodiment is next described by referring to FIG. 16. This processor can be built in a computer, for example. The icon display processor has an internal bus 200 with which a CPU 202 for executing programs and arithmetically processing data is connected. An input section 204 comprising a key board and a mouse, for example, is connected with the internal bus 200. A display portion 206 is connected with the internal bus 200 and made of a display device or the like. A program storage section 208 and a data storage section 210 are each made of a RAM, a ROM, a hard disk, or other storage device. In FIG. 16, they are shown as two storage sections 208 and 210, for convenience.

An OS (operating system) and various application programs are stored in the program storage section 208. In addition, an icon control program 212 and an icon displaying-and-processing program 213 are stored. The icon control program 212 is used to execute processing when icons are operated as shown in FIGS. 12–15. The icon displaying-and-processing program 213 is employed to carry out processing associated with display of icons as shown in FIGS. 2–11. That is, the main icon and the sub-icons are displayed integrally.

A file corresponding to the main data and files corresponding to sub-data are stored in the data storage section 210. In the present embodiment, an object managing table 214 is organized.

Figure 17:
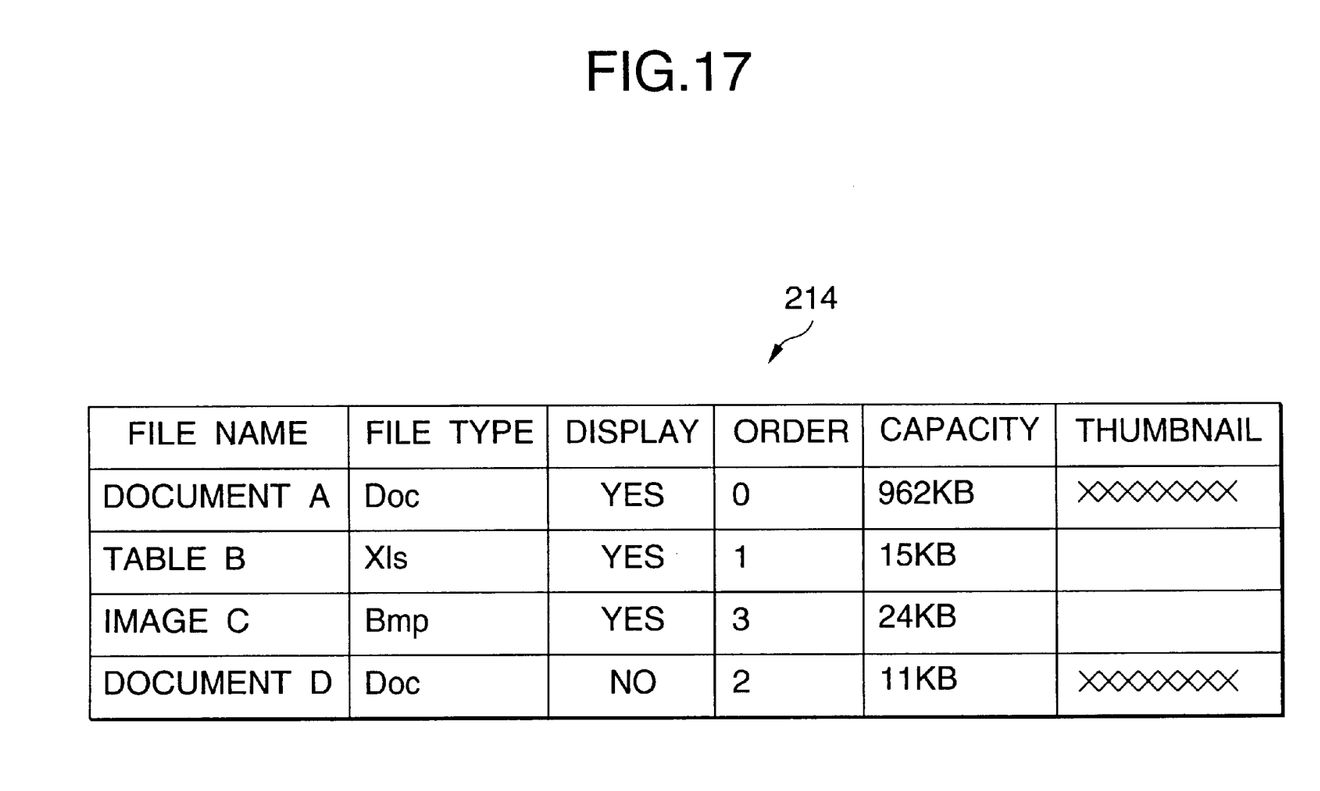
FIG. 17 is a table of an example of an object managing table.

Referring to FIG. 17, there is shown a specific example of the object managing table 214. This table 214 is created for each main data item. In this object managing table 214, the main data itself is managed as objects, and sub-data are managed as records. File types, the presence or absence of display, the order of the icons, the capacity, and the contents of thumbnails are associated as attributes with each object. The order of the icons indicate the turns of display of main icon and sub-icons. Order 0 indicates the main icon. In the present embodiment, the user can choose whether each sub-icon should be displayed (YES in FIG. 17) or not (NO). When the main data and sub-data symbolized by their respective icons are referenced, the file type inside the object managing table 214 is referenced. An application program corresponding to the file type is executed.

Figure 18:
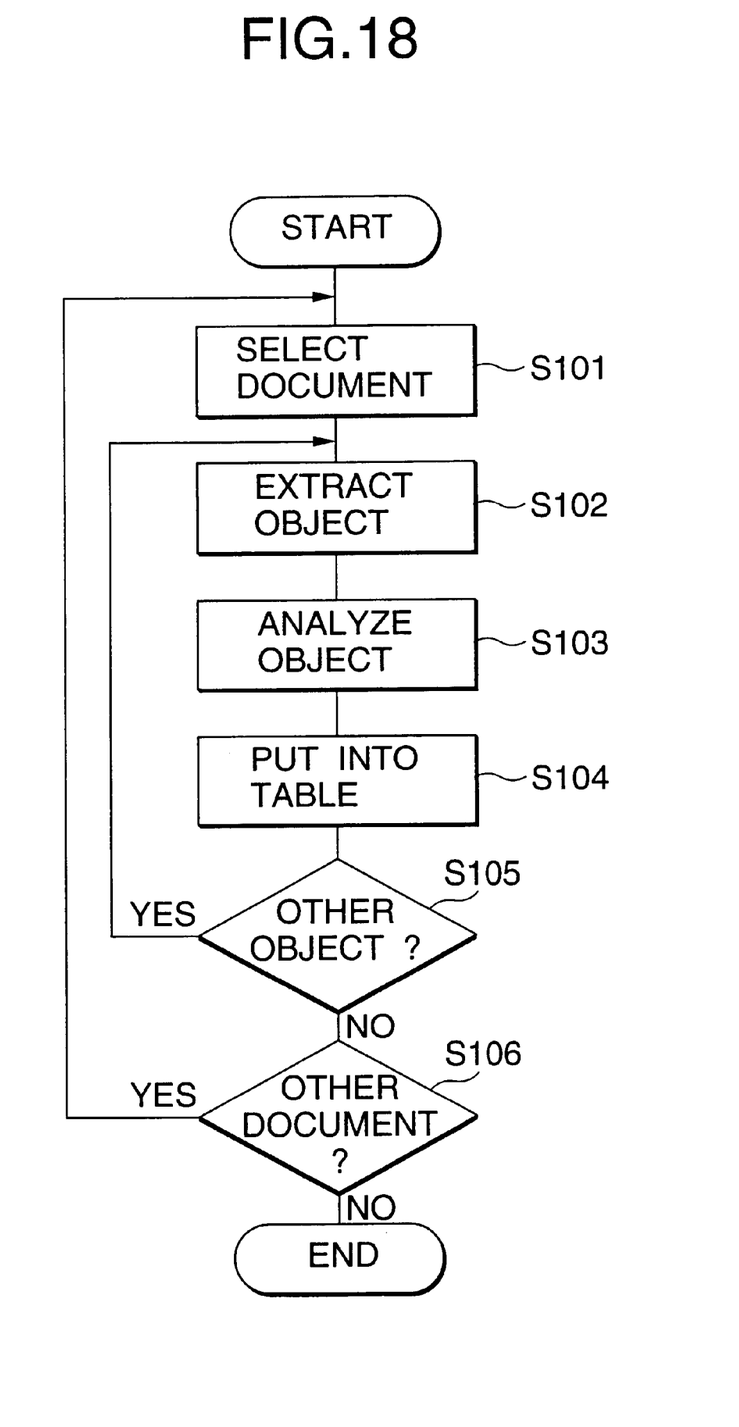
FIG. 18 is a flowchart illustrating a routine for creating the object managing table shown in FIG. 17.

FIG. 18 illustrates a routine for creating the object managing table. This routine is automatically carried out when a new document is read in or received or when the user has performed given processing.

Step 101 and the following steps are carried out to create an object managing table for each document or to update the table. If a document is selected, and if an object managing table 214 corresponding to the document exists, this object managing table is edited. If any table is not present, a new object managing table is created.

In step 102, the document selected in step 101 is treated as main data, and document in the main data is analyzed. Thus, objects that are sub-data contained in the main data are extracted.

In step 103, the objects extracted in step 102 are analyzed, and information about the file types and capacities of the objects is obtained.

In step 104, data about the objects extracted based on the results of analysis made in step 103 are sequentially put into the object managing table 214. In the initial setup, data about the order of icons is put into the table in the order in which the data about the objects are put into the table as mentioned previously.

In step 105, a decision is made as to whether other objects are contained in the main data. The above-described steps are repeated until data about all the objects in the main data are completely entered into the table.

In step 106, a decision is made as to whether there are any other document to be processed.

In the present embodiment, object managing tables are created or updated for all documents. This processing may also be done only for a document indicated by the user.

Processing for extracting objects from a document that is main data and for creating or updating an object managing table is described in detail below. In the present embodiment, it is assumed that the document consists of elements tagged as shown in FIG. 10.

Figure 20:
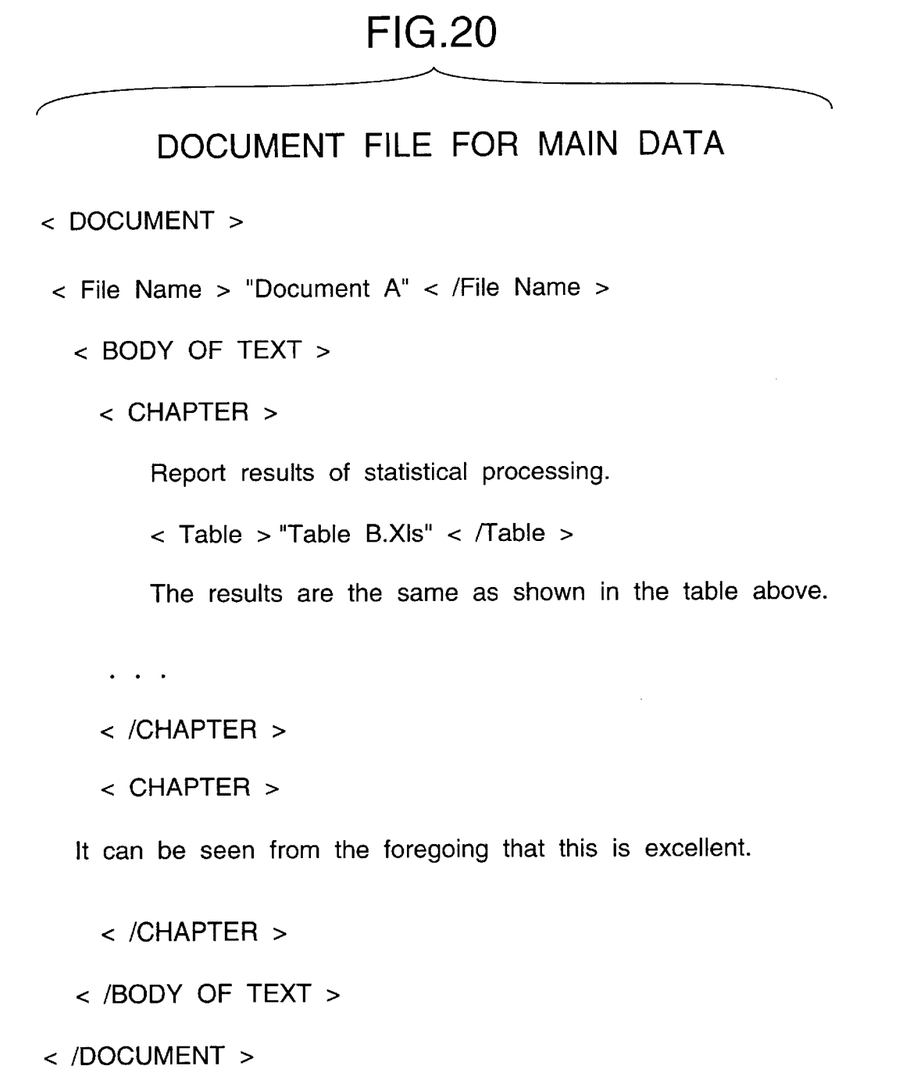
FIG. 20 is a view illustrating an example of document file for main data.

Each document element is represented by being surrounded by a given tag and a corresponding terminal tag. For example, table B is given by <Table>"Table B.Xls"</Table>

Objects can be extracted by analyzing the document written in this way and finding tags corresponding to the objects.

In step 101, a document to be processed is selected.

If "Table B.Xls" that is an object for a graph is extracted in step 102, the processor interrogates the operating system about the attributes of the file of "Table B.Xls". Thus, information such as file type "Xls" and file capacity "15 KB" is obtained (step 103).

In step 104, information (i.e., file name "table B", file type "Xls", and file capacity "15 KB") regarding the object "Table B.Xls" obtained in the above-described step is added to the object managing table. In the initial setup, a new order is given whenever new information about an object is added. The "display" is set to "YES".

Because of the steps described thus far, an object managing table is created or updated. Steps 105 and 106 are performed to make a decision as to whether there is any other document to be processed. In this way, all documents are processed.

Figure 19:
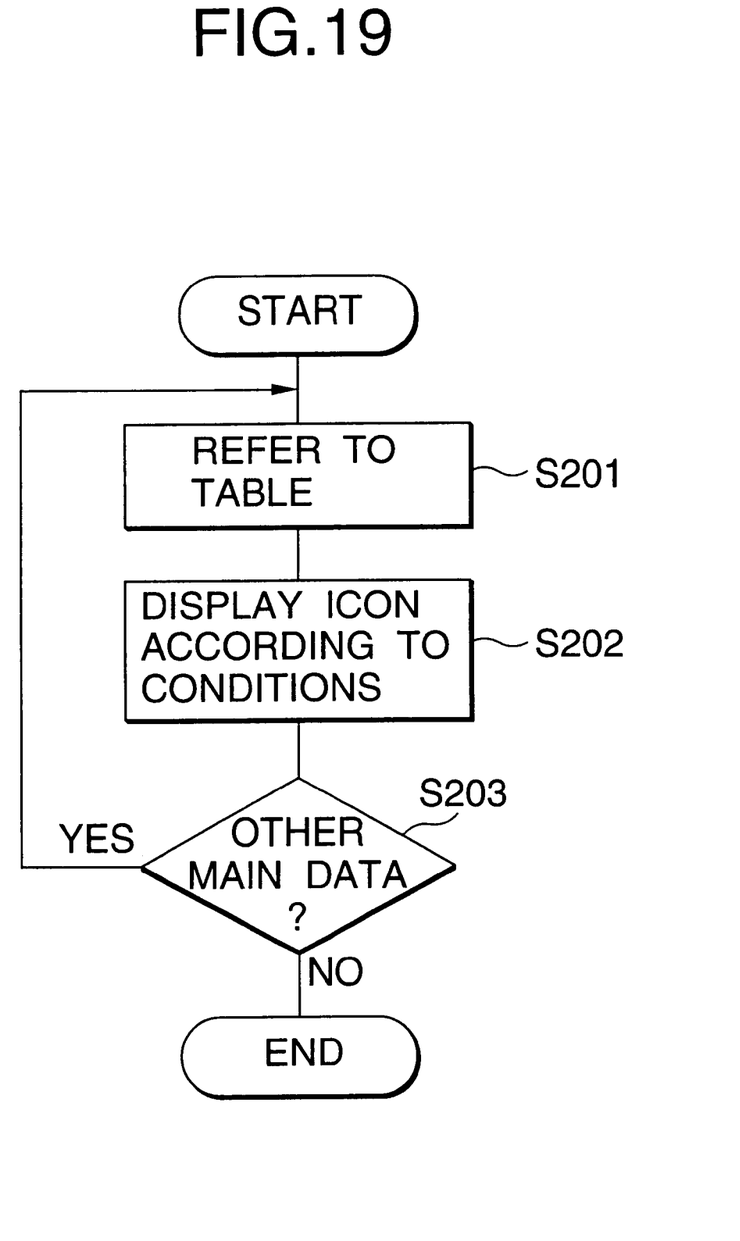
FIG. 19 is a flowchart illustrating a routine for displaying icons.

FIG. 19 illustrates an icon displaying-and-processing routine. This routine is executed whenever a main icon is displayed.

In step 201, the object managing table is referenced. In step 202, display of the main icon and sub-icons is carried out according to preset display conditions (display mode and display rules). In step 203, a decision is made as to whether there is any other main data. The steps described thus far are repeated for all main data items.

In step 202 described above, if an overlap display mode is selected as shown in FIG. 2, the icon displaying-and-processing program 213 illustrated in FIG. 16 is processed in the manner described below.

An object managing table corresponding to the document of main data to be displayed is referenced. A sub-icon for an object having a maximum value of "order" in the object managing table is displayed.

Then, a sub-icon for an object that is next in the value of "order" in the reverse direction is displayed in an incrementally shifted position. That is, this sub-icon overlaps with the former sub-icon. The displayed position is shifted to the left and in the downward direction in an increment.

This processing is performed to display sub-icons in turn in the reverse direction to the order in the object managing table. Finally, processing for displaying the main icon at the obliquely shifted, left bottom position is carried out.

That is, the icons are displayed so as to overlap with each other. Therefore, the main icon is displayed in the forefront, i.e., priority is given to this main ion. Where the parallel display mode as illustrated in FIG. 3 is selected, a main icon and sub-icons are displayed in turn.

Where a title such as a file name is displayed together with an icon, only the title of the main icon at the highest location may be displayed. If necessary, a title maybe displayed for each icon.

Where the number of icons to be displayed is in excess of a given value, the display method maybe automatically changed. For example, even if the expansion display shown in FIG. 9(B) is selected, normal display as shown in FIG. 9(A) may be provided.

The main icon and sub-icons in the present embodiment may symbolize the contents of the files. Alternatively, they may be reference icons consisting only of reference icons indicating the locations at which the files are loaded.

As described thus far, the present invention permits a user to intuitively recognize sub-data embedded in, or linked to, main-data while a main icon for the main data is being displayed. Furthermore, the sub-data embedded in, or linked to, the main data can be directly handled.

What is claimed is:

1. An icon display processor comprising:
   a main icon display unit that displays a main icon representative of main data;
   a sub-icon display unit that displays sub-icons representative of sub-data together with the main icon where the sub-data form parts of the main data and are embedded-in, or linked-to, the main data; and
   a mode-selecting unit that chooses between a close display mode in which plural sub-icons are displayed so as to be located densely and overlap with each other and an expansion display mode in which plural sub-icons are displayed so as to be located less densely and overlap with each other.

2. The icon display processor of claim 1, wherein the sub-icons are displayed close to the main icon.

3. The icon display processor of claim 1, wherein the sub-icons displayed are located behind the main icon and overlap with the main icon.

4. The icon display processor of claim 1, wherein each of the sub-icons is displayed for each item of sub-data.

5. The icon display processor of claim 1, wherein each of the sub-icons is displayed for each kind of sub-data.

6. The icon display processor of claim 1, wherein the sub-icons assume forms corresponding to kinds of the sub-data.

7. The icon display processor of claim 1, wherein there is further provided a program-activating unit that, when given processing is performed on one of the sub-icons, activates an application program corresponding to the sub-icon, and wherein the application program processes sub-data symbolized by the sub-icon.

8. The icon display processor of claim 1, further comprising a copying unit that, when given processing is performed on one of the sub-icons, copies sub-data symbolized by the sub-icon.

9. The icon display processor of claim 1, wherein an object managing table is formed for each item of the main data to manage kinds and order of sub-data items.

* * * * *